W. R. WHITNEY.
CARBON, FILAMENT, AND METHOD OF MAKING THE SAME.
APPLICATION FILED FEB. 2, 1905.

916,905.

Patented Mar. 30, 1909.
4 SHEETS—SHEET 1.

WITNESSES:

INVENTOR:
Willis R Whitney,
By Albert G Davis
Atty.

W. R. WHITNEY.
CARBON, FILAMENT, AND METHOD OF MAKING THE SAME.
APPLICATION FILED FEB. 2, 1905.

916,905.

Patented Mar. 30, 1909.
4 SHEETS—SHEET 2.

WITNESSES:
INVENTOR:
Willis R. Whitney,
By Albert G. Davis
Att'y.

W. R. WHITNEY.
CARBON, FILAMENT, AND METHOD OF MAKING THE SAME.
APPLICATION FILED FEB. 2, 1905.

916,905.

Patented Mar. 30, 1909.
4 SHEETS—SHEET 3.

WITNESSES:

INVENTOR:
Willis R. Whitney,
BY _______ Att'y.

W. R. WHITNEY.
CARBON, FILAMENT, AND METHOD OF MAKING THE SAME.
APPLICATION FILED FEB. 2, 1905.

916,905.

Patented Mar. 30, 1909.
4 SHEETS—SHEET 4.

Fig. 8.

Witnesses:
George W. Tilden.
Arlen Orford.

Inventor:
Willis R. Whitney,
by Albert G. Davis
Att'y.

UNITED STATES PATENT OFFICE.

WILLIS R. WHITNEY, OF GLENVILLE, NEW YORK, ASSIGNOR TO GENERAL ELECTRIC COMPANY, A CORPORATION OF NEW YORK.

CARBON, FILAMENT, AND METHOD OF MAKING THE SAME.

No. 916,905.  Specification of Letters Patent.  Patented March 30, 1909.

Continuation of applications Serial No. 192,585, filed February 8, 1904, and Serial No. 193,666, filed February 15, 1904. This application filed February 2, 1905. Serial No. 243,781.

*To all whom it may concern:*

Be it known that I, WILLIS R. WHITNEY, a citizen of the United States, residing at Alplaus, in the town of Glenville, county of Schenectady, and State of New York, have invented certain new and useful Improvements in Carbons, Filaments Thereof, and Methods of Making the Same, of which the following is a specification.

My invention or discovery resulted from an attempt to improve carbon filaments such as are used in incandescent lamps, and embraces not only a novel filament and a novel method of manufacture thereof, but also the substance involved in the composition of the filament, which substance I believe to be a new form of carbon, or more specifically a new form of graphite.

Before proceeding to a detailed description of my invention it will be of assistance to refer briefly to the mode of manufacture of the ordinary carbon filament, which is substantially the only filament in use in this country to-day. This process consists in dissolving good, clean, commercial cotton or other natural cellulose in some suitable solvent, and squirting the same through a die into a fluid hardener. The resulting filament is then dried, cut into lengths and carbonized by heating out of contact with the air at such temperature as may readily be obtained by a gas furnace. The filament in this condition has long been known to those skilled in the manufacture of incandescent lamps as a "base filament" and consists of carbon in a form very like dense, hard charcoal. It is usual to "treat" or "flash" the base filament after the completion of the process described above, by immersing it in a hydrocarbon vapor, such as vapor of benzin, and passing such a current through it as to raise it to a temperature which will cause a decomposition of the hydrocarbon and a consequent deposition of the resulting carbon or carbon compound on the filament. This flashing process reduces the resistance of the filament, and in commercial work it is customary to thus flash the filament until its resistance reaches a certain standard value depending upon the particular circuit on which the lamp is intended to run, the candle power desired, etc., and this flashing process is the last step in the manufacture of the filament. This coating or deposit from the hydrocarbon vapor consists, without doubt, principally of carbon, and tests which I have made show that it is in the form known as graphite; at least it answers the standard tests for graphite as established by Berthelot, an eminent authority on this subject, as for example by producing graphitic acid, a yellow insoluble substance, when treated with highly oxidizing reagents, such as a mixture of anhydrous nitric acid and potassium chlorate, while ordinary carbon is dissolved thereby, and further it gives the characteristic graphite luster when rubbed on paper. The ordinary commercial carbon filament consists then of a dense, hard carbon base, slightly impure, surrounded by a shell or coating consisting mainly or entirely of graphitic carbon or graphite. Such a filament may be said to be composite.

Characteristic features by which incandescent lamp filaments may be recognized and distinguished are their resistance curves and their life curves. The exact nature of these curves will be explained below, but for the present it will be sufficient to state that a standard carbon filament of the prior art, either flashed or unflashed, as above described, falls in electrical resistance, when its temperature is raised above atmospheric temperature, until near its standard temperature of incandescence its resistance is substantially fifty per cent. of its cold resistance, while the useful life of a lamp containing such a filament is somewhat less than five hundred hours when burning at such voltage that for every three and one-tenth watts of electrical energy imparted to the lamp one candle power of light is produced. I may here remark that the number of watts expended for each candle power of light is the usual measure of efficiency of the lamp; the fewer the watts per candle the higher the efficiency. Incandescent lamps fall in efficiency as they are used and it is obvious that when a lamp has fallen in efficiency beyond a certain amount, that is to say, when a relatively large increase in the number of watts necessary to produce each candle power takes place, it is no longer wise to burn that lamp but it is then more economical to destroy it and to replace it with a new one. The exact loss of efficiency which justifies the destruction of a lamp or, as it is called in the art, the exact "smashing point" of a lamp, must depend upon various practical conditions such as the cost of producing and supplying electric current, the cost of the lamp itself, etc., so that the actual practice of different lighting stations is not uniform, but it is quite generally recognized that a lamp which has fallen to eighty per cent. of its initial candle power should be removed or destroyed; that is to say, eighty per cent. is somewhat arbitrarily, but quite generally, taken as the "smashing point." It will also be obvious that the useful life of any incandescent lamp, or the number of hours of burning before the "smashing point" is reached, will depend upon the rate at which it is burned or, in technical language, the efficiency at which it is run. By increasing the amount of electrical energy supplied to a lamp (by increasing the voltage at the terminals) it is possible to increase greatly not only the amount of light given by the lamp but even the efficiency, but only at a great sacrifice of useful life. For example, if the ordinary incandescent lamp be burned at two watts per candle power it will have a useful life of roughly forty hours or less, whereas if burned at the usual efficiency of 3.1 watts per candle it would have had a useful life of a little under 500 hours.

My researches have led me to the discovery that if a flashed filament, such as I have described above, be heated or fired at certain extreme temperatures which I have been able to establish in a carbon tube electric furnace, the characteristics of the filament undergo most remarkable changes; thus the cold resistance of the filament after such heating is very much lower than the original cold resistance, while the resistance at running temperatures is either not appreciably reduced or is reduced to a less extent. Thus the resistance of the ordinary treated or flashed filament of the prior art, as stated above, decreases rapidly with increase of temperature, and at some point not far removed from the running temperature always becomes as low as about fifty per cent. of the cold resistance. But the resistance of the new filament never becomes, with increase in temperature, as low as fifty per cent. of its cold resistance, and in cases where the firing in the furnace has been carried on at extreme temperature it actually becomes much higher than the cold resistance. The mean "temperature-resistance coefficient," between 20 degrees centigrade and the temperature at which the lamp is run, of the best filaments made in accordance with my invention is therefore positive, while the corresponding coefficient of the ordinary filament of the prior art, flashed or unflashed, is strongly negative. It will be understood that the beneficial effects of my invention may be obtained by firing at a very high temperature within a region which I have hereinafter attempted to indicate. If the temperature of firing approaches the minimum limit the resulting filament, as compared with an ordinary flashed carbon filament, decreases a less percentage in resistance with increase in temperature than does the ordinary filament when heated to the same temperature. If the temperature of firing be considerably higher than the minimum limit, the filament, when hot, has a resistance higher than its cold resistance. Results intermediate between these are obtained by firing at temperatures between the extremes mentioned, and I desire it to be understood that although I prefer to use temperatures the highest conveniently obtainable, my invention is to be construed as covering filaments possessing the qualities herein indicated.

The characteristics above discussed serve to help to identify the article constructed in accordance with my present invention, but from the point of view of incandescent-lamp manufacture the most important feature of improvement lies in a certain increase which my present invention makes in the efficiency or life of the lamp; that is to say, I find that when the lamp in which my filament is placed is run at such a candle-power that its useful life is reduced to that of the ordinary carbon incandescent lamp above described, an improved efficiency is obtained, while if the lamp is so run as to give the same efficiency as the standard lamp, then its useful life is increased; in other words, the important feature of my invention from this point of view is an improvement of the lamp itself, and by adjusting the resistance, voltage, etc., in a manner well known to those skilled in the art, this improvement can be caused to appear in efficiency or in life or in a combination of both.

I will now describe more in detail the best manner known to me of carrying out my invention and will do so in the knowledge that the invention is susceptible of many modifications.

The scope of my invention I will indicate in the claims appended hereto.

In the drawings attached hereto.

Figure 1:
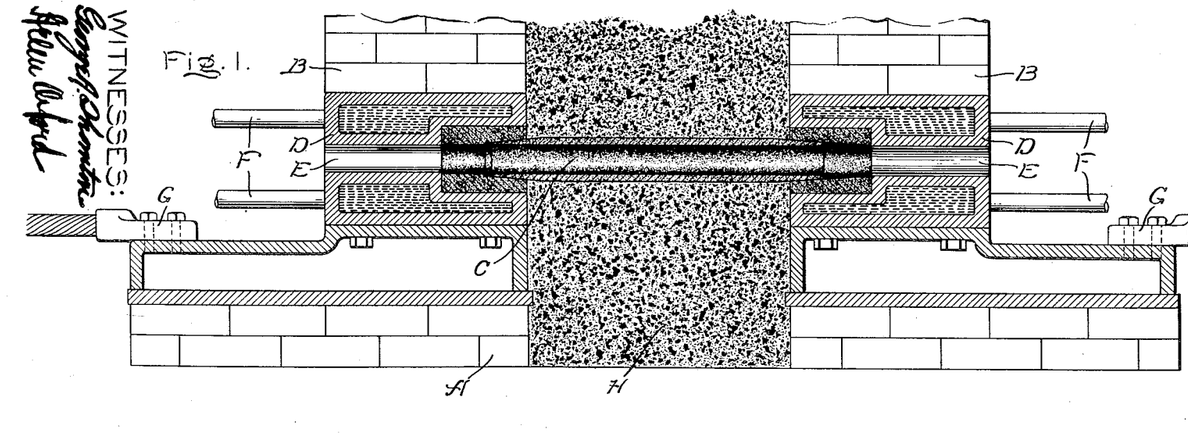
Figure 1 is a view in section of a furnace such as I use.

In Fig. 1, A is a base or foundation and B B are terminal walls of brick, constituting with the side walls a brick chamber open at the top. The ends of the carbon tube C are clamped into water-cooled, carbon-bushed, metal terminals D having openings E, concentric with the bore of the tube, through which material to be fired is passed. Water conduits F and current-conveying leads G are fixed to these terminals, while the whole space about the tube is filled with powdered carbon or graphite as at H, either with or without a layer of titanium carbid immediately surrounding the tube. I usually close the ends of the carbon tube by plugs of asbestos wool. It is evident that the carbon tube furnace may be of any suitable construction, but I have obtained very good results by using a furnace such as represented in the drawings, in which the carbon tube is about two and one-half inches in outside diameter, one and three-quarters inches inside diameter, and twenty inches in total length, including the taper at both ends.

Figure 2:
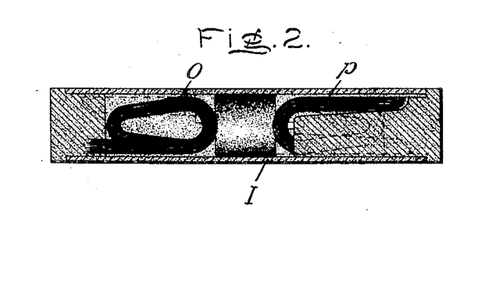
Fig. 2 is a sectional view of a carbon capsule or boat.
Figure 3:
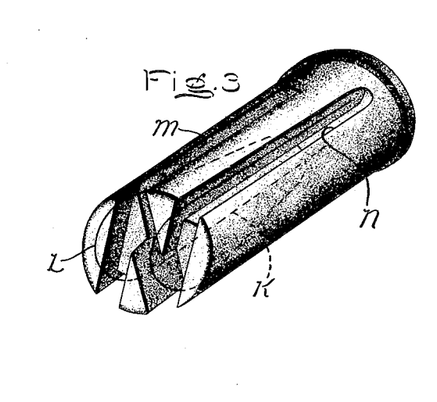
Fig. 3 is a perspective view of one of the plugs fitting into the ends of the capsule or boat.

In conducting the firing operation, the filaments, before being inserted into the tube of the furnace, are inclosed in suitable boats or capsules. One form of boat which I have used consists of a tube filled with powdered graphite held in place by removable stoppers. The filaments, in bunches, are placed in the tube and the graphite powder packed around them. Instead of this simple form of capsule I may use the form shown in Fig. 2 of the drawings, in which the carbon tube I is nearly filled by stoppers of special construction fitting into the respective ends. One of these stoppers is shown in perspective in Fig. 3 and consists in general form of a cylinder provided with longitudinal grooves to receive a bunch of coiled filaments. One leg of this bunch extends along an under-groove in the plug as indicated by the direction line at K; then it passes over the end of the plug at L and after looping down and back through the cut M, which extends completely across the plug, turns and lies along the groove N. The plug thus serves as a mechanical support for the bunch of coiled or looped filaments. Plugs of this character inserted in the respective ends of the tube I, Fig. 2, carry the bunches of filaments as indicated at O and P.

Before proceeding to actual firing of the filaments, the furnace, together with the boats and any packing material such as graphite which may be used therein, is subjected to a preliminary firing in order to drive off impurities commonly present in the materials used. For this purpose the furnace, with the boats in place in the tube, but in this case without the filaments, is heated to such a temperature as to drive out most of the mineral impurities such as clay, silica and the like. If this preliminary firing be not employed the results obtained are apt to be unsatisfactory at least as to the first batch or batches of filaments fired.

The furnace and the boats having received their preliminary firing, the operation of the firing of the filaments may then be commenced.

I find it desirable for reasons described below, though not essential, to subject the base filament to which my invention is to be applied to a preliminary firing before it is treated or flashed.

My process then in its more perfect form consists in firing an ordinary base filament at a very high temperature, allowing it to cool, then subjecting it to the ordinary flashing or treating process, whereby it receives a deposit of what I believe to be graphitic carbon, and then again firing it at a very high temperature.

The current which I use with the furnace having a tube of the above dimensions may vary from about 2000 amperes to about 3000 amperes. The energy employed may vary; I get good results with the expenditure of 33 kilowatts. The temperature of a furnace of given construction and dimensions obviously depends on the current, and owing to the difficulty of measuring with accuracy the high temperature employed I sometimes find it preferable to indicate, and herein have indicated, the temperature by reference to the current used for a known or standard furnace such as described rather than to attempt in all cases to indicate the temperature in degrees centigrade. I shall therefore hereinafter refer to the current in the primary of a transformer, having a ratio of turns of eighty to one, which I employ to supply current to my furnace.

The time of passage of the filament through the furnace during firing may be varied widely. In some cases I pass the boats rather quickly through the furnace at such a rate that each boat is in the furnace only for a few minutes, and in other cases I have passed them more slowly so that the passage of a single boat through the furnace occupies several hours. I am of the opinion, however, that it is only necessary that all the filaments reach the proper temperature. I have also obtained good results simply by packing the filaments in the boats with carbon or graphite dust, placing one or more of these boats in the middle of the furnace tube, and supplying current at such a rate and for such a time as practically to destroy the tube, though this last modification I have used more commonly in the second firing of the filaments, after they have been flashed, than in the first firing. The temperature of the second firing may or may not be the same as the temperature of the first firing. As temperatures are important in practicing my invention, considerable effort has been expended in an endeavor to measure them, though measurements of the temperatures herein dealt with are difficult, and at the best somewhat uncertain. I have obtained what I believe to be good results in such temperature measurements by holding an ordinary incandescent lamp in the line of vision between the eye and the interior of the furnace, and then varying the voltage impressed on the lamp until the filament reached such a temperature that it could not be seen against the bright background of the furnace interior. After making this adjustment it is found that with the furnace which I have described this test lamp is running at about double its normal voltage or higher. Thus, if a fifty volt incandescent lamp be employed, then for the purposes of this measurement, the lamp is found to run in the neighborhood of one hundred volts or more. I have calculated this temperature from the law of Lummer, that at high temperatures the ratio of luminosities of a filament equals the twelfth power of the ratio of the absolute temperatures. Assuming that the filament of the incandescent lamp has the same temperature as the interior of the furnace, the temperatures which I believe best calculated to produce the desired results appear to be in the range between about 2300 and 3700 degrees centigrade or higher. These temperatures, as measured in the above manner, check fairly with the readings of temperatures of the furnace obtained by the use of an instrument known to physicists as the Wanner spectro-photometric pyrometer.

It is difficult to state with certainty the minimum limit of furnace temperature at which the beneficial effects of my invention are obtained, though I at present believe the results cannot be obtained below 2000 degrees centigrade. Better results require a higher temperature, and for the best results the temperature must be at or above a temperature much higher than this and at which quartz, platinum, and rare oxids, etc., vaporize and disappear. At such temperatures even the carbon tube is in a comparatively short time destroyed and, at the highest temperatures mentioned above, the tube lasts only a few minutes.

The filaments resulting from this process possess the following characteristics and may be recognized thereby: The curve representing the change of resistance with temperature of the filament when mounted in a lamp is greatly modified as compared with that of the ordinary flashed or treated filament, and in a degree depending upon the temperature at which the filament, with its flashed coating, is fired. If this last firing is done at a temperature in the lower portion of the range above indicated, the temperature resistance curve, with increase in temperature of the filament, shows a minimum resistance greater than fifty per cent. of the cold resistance, while if the temperature of firing of this flashed filament be somewhat higher the curve drops at its lowest point, or point of inflection, to say eighty per cent. of the cold resistance and then partly recovers, and at a still higher temperature of firing the curve is nearly a straight horizontal line, and at still higher temperatures the curve rises almost or quite continuously above the ordinate representing the cold resistance. In other words, when the firing is carried on at extreme temperatures as before mentioned, the temperature resistance coefficient of the filament, except possibly, in a limited region near the starting point of the curve, is positive. It is difficult to be certain that the slight dip near the starting point, shown in all the curves, really exists in the filaments fired at the higher temperatures. The best filament has its specific resistance at ordinary atmospheric temperature reduced by the final firing process to a fraction, sometimes as low as twenty per cent., of the resistance before firing, and its temperature resistance coefficient becomes positive at least throughout the range in which the filament is luminous. The filaments in which the best results of my invention are obtained therefore have a higher resistance when running in the lamp than when cold. These characteristics are obviously sharply distinguished from the characteristics of all other forms of carbon.

Figure 4:
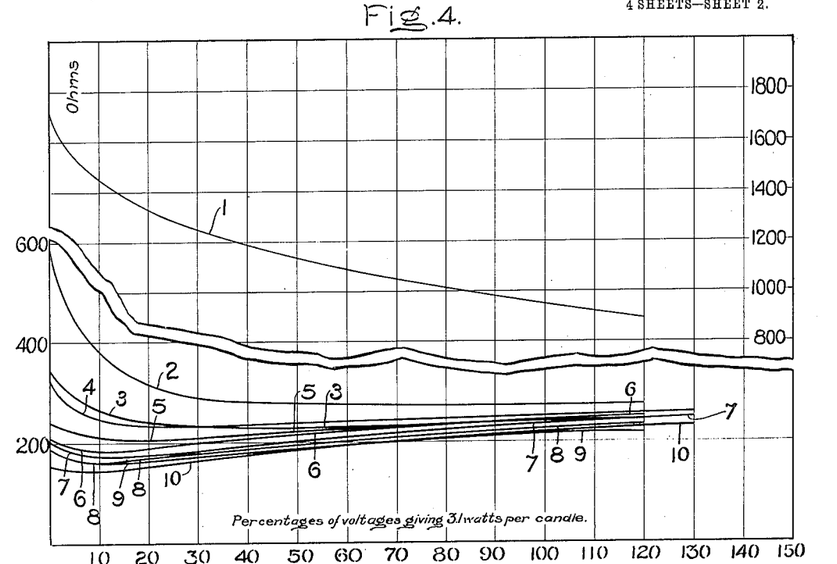
Fig. 4 is a set of curves showing the variations of ohmic resistances of a number of filaments with variations of applied voltages.

I do not know of any way in which filaments made in accordance with my invention may be pictorially represented by ordinary draftsmen's methods in such a manner as to distinguish them from filaments of the prior art. I may, however, illustrate the characteristics of filaments made in accordance with my invention by the use of curves representing the variations in magnitude of certain hereinbefore mentioned qualities of the filaments, and in the accompanying drawings I have provided a set of curves of this nature selected from a number of typical specimens which have undergone different variations of my process. All of the filaments shown were brought to the same cold resistance by the deposition of the coating of the flashing process and they were all as nearly as possible of the same dimensions, etc. In Fig. 4 the ordinates are plotted in ohms. The abscissæ correspond to voltages, and in order to conform to a standard for the purpose of comparison are plotted in percentages of voltages which, when applied to the respective filaments, cause the filaments to operate at an efficiency of 3.1 watts per candle. Thus while the voltages which give this efficiency may be different for the several filaments owing to differences in their resistance, cross section, etc., it is possible and convenient to ignore these differences by reducing their properties to a percentage basis. Referring in detail to the curves of Fig. 4, the curve numbered 1, which in order to save space is plotted to a smaller scale of ordinates than the other curves of this figure, represents the resistance with varying temperature of an ordinary "base" filament unflashed and unfired. Curve 2 represents a similar resistance curve of such a base filament after it has been flashed or treated and corresponds to a filament of the best quality now in every day use; that is to say, to a filament of the best standard commercial lamp of to-day. The remaining curves of this figure represent the observed effects of firing such flashed or treated filaments, in accordance with my invention, one at one temperature, another at another temperature, and so on. Curve 3 corresponds to a filament like that indicated by curve 2 but fired prior to flashing and again fired subsequently to flashing. The primary current supplied to the furnace (of the dimensions above set forth) during the first firing was 20 amperes, and that during the second firing was 26 amperes. It will be noted that the initial or cold resistance of the filament is much less than that corresponding to the filament of curve 2. Curve 4 is that of a filament fired before flashing at 24 amperes, and after flashing at 30 amperes. It will be observed that with this higher temperature of the final firing the initial or cold resistance of the filament is reduced more than that of the filament of curve 3. Curve 5 corresponds to a filament fired before flashing at 24 amperes, and after flashing or treating at 34 amperes. The initial or cold resistance is thus still further reduced. Curve 6 corresponds to a filament fired before flashing at 34 amperes, and fired after flashing at 34 amperes. Curve 7 represents a filament fired at 38 amperes before flashing, and again fired at 38 amperes after flashing. Curve 8 represents a filament which was not fired prior to flashing, but which after flashing was fired at 26 amperes. Curve 9 corresponds to a filament fired at 28 amperes before flashing, and then fired after flashing at 38 amperes. Curve 10 corresponds to a filament which was given a firing at 24 amperes prior to flashing, and was then fired at 38 amperes after flashing. In general the hotter the final firing the lower seems to be the cold resistance. Certain apparent discrepancies in this respect will be discussed hereafter.

Figure 5:
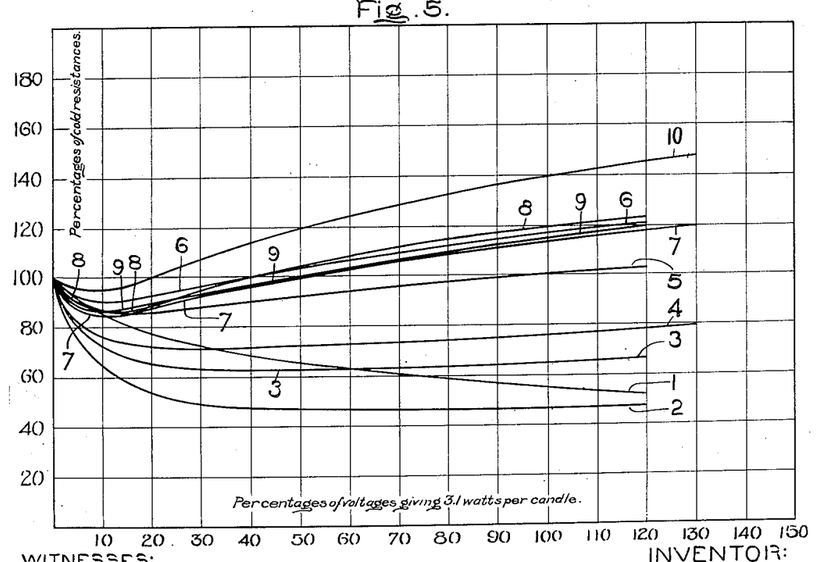
Fig. 5 represents the variations of the same filaments but plotted so as to show the percentage changes of resistance rather than the actual changes indicated in Fig. 4.

For showing in a general way the changes produced in the resistance characteristics of filaments by firing, reference may now be made to the changes in the character of the resistance curves corresponding to the respective fired filaments. This comparison is easily made, even when the filaments have different cold resistances, by replotting the curves so that the ordinates represent percentages of the cold resistances rather than absolute values, which were shown in Fig. 4, by which means the curves are made to start all from the same point, as shown in Fig. 5, and relative values are compared rather than absolute values. The curves in this figure are numbered from 1 to 10 and correspond respectively to the similarly numbered curves in Fig. 4. It will be seen that in a general way the filaments which had their final firings at the lowest temperatures, and still more that filament 2 which was not fired at all, decrease most in resistance as their temperature increases, while those filaments fired at higher temperatures decrease in resistance less or actually increase in resistance as compared with their cold resistance. In all of the cases plotted the resistance curves drop at first and then either become nearly horizontal or actually rise. Thus in the case of curve 10 the resistance rises practically continuously above the cold resistance, so that the temperature coëfficient may be said to be positive through practically the entire range. It will be observed moreover that in curve 2, which corresponds to an ordinary commercial filament, the resistance with increase of temperature drops to as low as fifty per cent. of the cold resistance, whereas in the case of all the fired filaments the drop in resistance is much less and in some cases there is, instead of a drop, an actual and very considerable rise in resistance over a considerable range of temperature. Thus in the case, for example, of filament 10 the resistance at the running temperature at which the lamp gives 3.1 watts per candle is about forty per cent. higher than when the filament is cold.

Figure 6:
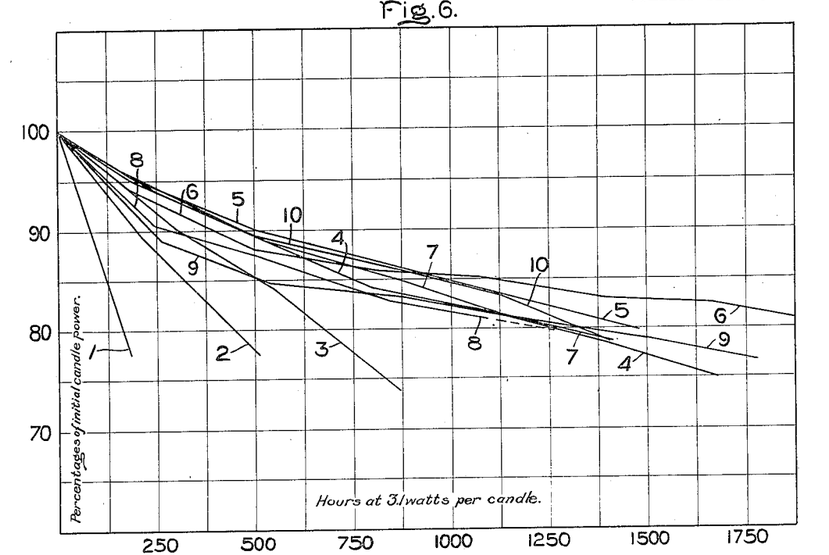
Fig. 6 represents the variation of candle power with length of life of the same filaments.

In order to perceive the effect produced upon the life of filaments prepared in accordance with my invention or, in other words, to see how my invention affects the action of an incandescent lamp, reference may be made to Fig. 6. In this figure the abscissæ of the curves are plotted in hours of burning and the ordinates in percentages of candle power. All of the tests from which these curves were made were made under the same conditions and were reduced to an efficiency of 3.1 watts per mean horizontal candle power, which is at present regarded as a high standard efficiency and is the rating on which large numbers of the best lamps are sold. The curves in Fig. 6 are numbered from 1 to 10 as in the preceding figures and correspond respectively therewith. Curve 2, Fig. 6, represents the variation of candle power with hours of burning at 3.1 watts per candle of the ordinary good commercial filament or, more accurately, of a lamp containing such a filament. It will be observed that at the end of a little less than 500 hours this filament falls to eighty per cent. of its initial candle power. The improvement produced by flashing or treating is seen by comparison with curve 1 representing the life of the corresponding base filament. The other curves of Fig. 6, representing filaments fired under varying conditions and temperatures, show a great increase in life over that of the ordinary filament. Thus curve 3, representing a filament fired at the lowest of the temperatures which I have used, shows a useful life at 3.1 watts per candle of something like 680 hours. In a similar way the life curves of the other filaments may be observed. The lamp of curve 6 for example did not fall to eighty per cent. until the expiration of about 2000 hours, that is to say its useful life was over four times that of a standard lamp. Some of my results are still better, the useful life of some filaments having passed 2500 hours at an efficiency corresponding to 3.1 watts per candle, corresponding to about 720 hours useful life at 2.5 watts per candle. There is not a strict agreement between all the curves, yet as a general rule they show that the higher the temperature of firing the longer the useful life. It must be borne in mind, of course, that the results obtained are liable to variation depending upon conditions under which the process is carried out, or even upon inevitable variation in the filament or the treatment. With any particular set of conditions, however, such as may be duplicated in practice, the results obtained substantially agree.

Figure 7:
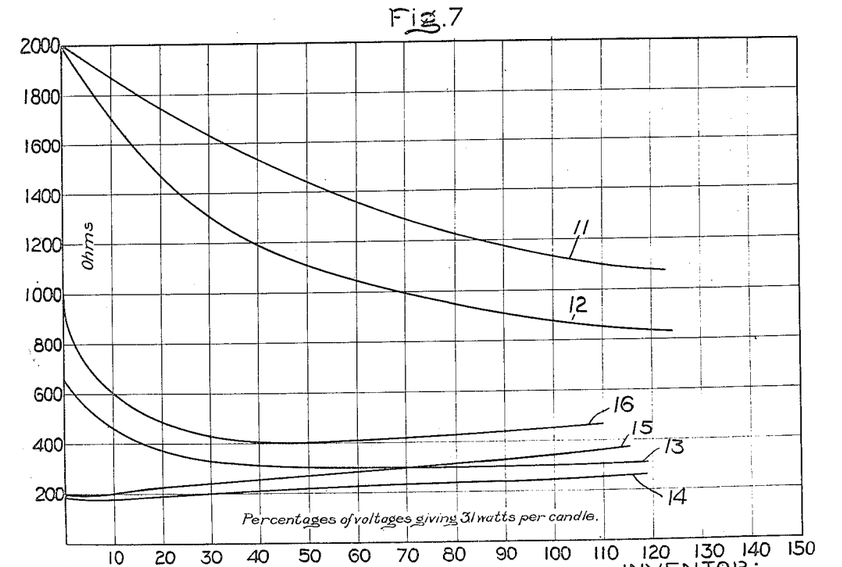
Fig. 7 represents the typical changes in characteristics of a filament subjected to the various stages in my process of manufacture.

In the foregoing sets of curves I have represented the comparative effects of different temperatures of firing, but without tracing the changes which a single filament undergoes in the process. The general nature of these changes I have roughly indicated in Fig. 7. In this figure the curve 11 represents the variation of resistance with temperature of an untreated or unflashed base filament. After this base filament has received its first firing, in accordance with my invention, the temperature resistance curve becomes changed as represented at 12. It will be seen that the cold resistance is practically unchanged while the hot resistance has become slightly lower. Upon flashing or treating this base filament in the usual manner in a hydrocarbon vapor the resistance, of course, is greatly reduced, though the character of the curve of resistance may not be very greatly altered, as will be seen by an inspection of curve 13. Upon firing such a flashed filament in accordance with my invention, and in this instance at a relatively high temperature, alterations in the filament take place such that the temperature resistance curve is changed to that indicated at 14. This last curve shows that the firing lowers the cold resistance but may not greatly change the hot resistance of the filament. Obviously the filament considered in Fig. 7 is a composite filament, that is to say, it is a filament consisting really of two conductors in parallel, an inner carbon base and an outer shell or skin. If the curve 12 is the resistance curve of the fired carbon base before flashing, the curve of the carbon base after the second firing will be similar in form since the second firing makes, as I have observed, relatively little change in the nature of the base. The curve 14, being the curve of the finished filament, obviously represents the temperature resistance characteristics of the above-mentioned composite conductor, and by calculations based on the well-known mathematical laws of parallel electric circuits it is possible to calculate the curve 15, which is the curve of the temperature resistance characteristics of the skin or coating. This curve 15, the temperature resistance curve of the skin or coating of my finished filament, is a curve characteristic of a metal conductor and very different from the curve of any form of carbon known to the art. It may be compared with the curve 16 which is a similar curve of the skin or coating of the filament of the prior art, calculated from the curves 11 and 13. It will be obvious therefore that some profound change has taken place in the nature of this skin or coating. I have found that it is possible in some cases to remove from a filament produced in accordance with my invention, for example from an ordinary sixteen-candlepower filament which has been subjected to the treatment above set forth, a section of the shell, coating or flashing. By careful manipulation I have obtained such sections an inch or more in length and find such a section to consist of a little tube with very thin walls. The material of this tube possesses characteristics, as above indicated, radically different from those heretofore predicated of carbon. I believe this tube to be a new form of carbon, and specifically a new form of graphite, since it differs from ordinary graphite or from the original graphitic coating of the filament in many respects. It answers the chemical test for graphite above set forth but reacts with oxidizing reagents (such as nitric acid and potassium chlorate) to form graphitic acid very much more readily than does any other form of graphite with which I am acquainted. For example this new form of graphite was treated for several hours at 60 degrees C. in a mixture of anhydrous nitric acid and potassium chlorate. It was then filtered, washed with nitric acid and the above operation was repeated until it had been performed four times. The powder was then treated with potassium permanganate and finally with hydrogen peroxid. The same operation was performed the same number of times with a material which is commercially know as Acheson graphite, an artificial graphite produced by exposing carbon to high temperature. At the end of this process the Acheson graphite was dark green while the new form of graphite was yellow or yellow-green showing that it had been more completely transformed. The properties of this new form of graphite may vary depending upon the temperature of the final firing. If the temperature of firing be such as corresponds to curve 3, Fig. 6, or in that neighborhood, the temperature resistance curve of this new form of graphite may be such as to show a slight negative temperature co-efficient; that is, it may depart to a certain extent from curve 15, Fig. 7, in the direction of curve 16, Fig. 7.

Throughout this specification where I have alluded to temperature coefficients I have been considering these coefficients between the temperature of 20 degrees centigrade, that is to say, the ordinary temperature of the air, and the temperature of working incandescence of the filament.

In general this new form of carbon is characterized by a temperature coefficient either actually positive or if negative less in amount than that of any other form of carbon known, and it may, if the temperature of the final firing has been high, have a positive temperature coefficient such that its resistance at running temperatures is very much in excess of its cold resistance. Such a temperature characteristic, that is to say, a temperature coefficient such as to give in all cases a temperature-resistance curve rising substantially above the characteristic temperature-resistance curve of carbon, as explained above, I call herein a metallic temperature characteristic. Another important characteristic of this new material is its low resistance at ordinary atmospheric temperatures. This characteristic again may vary depending upon the temperature of the final firing and also indirectly, as explained below, on the temperature of the preliminary firing, but in any case it is relatively low. In filaments which I have produced the specific resistance at ordinary temperature, say 20 degrees centigrade, of this new material varies from 0.00006 to 0.00016 ohms per cubic centimeter; or 0.6 to 1.6 ohms per unit of one meter long by a square millimeter section. Zellner (*Die Künstlichen Kohlen*, p. 251, published by Julius Springer, Berlin 1903), gives the resistance of ordinary carbon per unit of one meter long by a square millimeter section, as 20 to 50, Ceylon graphite 2 to 8, and "Acheson" artificial graphite 12. The material is non-magnetic, and may have a decided luster. Its specific gravity is considerably higher than that of the original flashing or coating before the heat treatment.

The tube above referred to is believed to consist entirely of the new form of carbon above mentioned, and constitutes a hollow filament which is capable of being mounted and operated as the filament of a lamp. Owing, however, to the difficulty of obtaining these tubes in lengths suitable for lamps of the more common standard voltages, I find it better, at the present time, to use the composite filaments consisting of a core of ordinary carbon and a shell of the new form of carbon as fully described above.

My invention may be practiced and improve dresults obtained, by a single firing, at the proper temperature, of the ordinary flashed or treated filament. In describing, however, the best mode known to me of carrying out my invention, I have prescribed a firing of the base filament prior to flashing or treating thereof and a subsequent firing after the flashing or coating obtained by treatment in the hydrocarbon has been applied. This double firing obviates or prevents the appearance of minute bubbles or blisters on the surface of the filament as may occur, particularly if the final firing is at very high temperatures, when no preliminary firing of the base filament is had. These bubbles have the appearance of being caused by gas pressure developed within the filament while the coating or flashing is in a pasty condition. It is probable that the bubbles are caused by the effort of impurities, metallic or otherwise, to escape from the base filament through the coating or flashing. The preliminary firing of the base filament, by removing to a greater or less extent these impurities, has, I find, the effect of preventing the appearance of these bubbles in the filament. The double firing of the filaments results in a somewhat different appearance in the completed article. When the filament is fired after flashing, but not before flashing, the surface is black and shiny although apt to be marred by the presence of bubbles or blisters. A filament which has been fired twice, once before flashing or treating and once after, will have a surface which is free from bubbles and which may, under certain conditions, have a gray, velvety appearance. I think it best to raise the temperature of the filament rather slowly in the first firing, to avoid a weakening of its structure due to a too sudden escape of gas.

Figure 8:
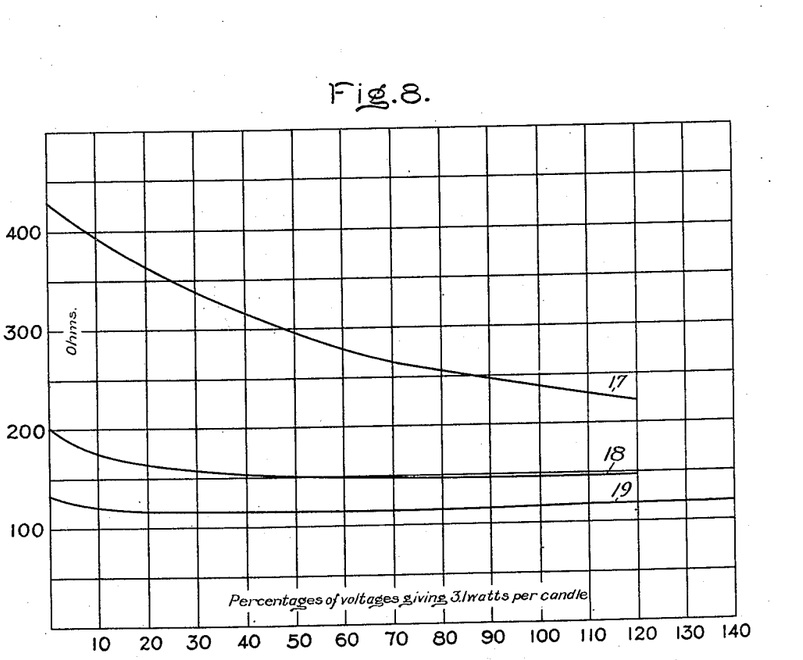
Fig. 8 represents resistance characteristics of carbonized bamboo filament subjected to my process.

Other filaments than squirted cellulose filaments have been treated in accordance with my invention, with similar results, and in other respects the treatment may be modified, thus I have found that by taking a carbonized bamboo filament and coating it with hydrocarbon, as by dipping in asphaltum, and then, after again carbonizing, firing it in the furnace at the high temperatures hereinbefore mentioned, I can obtain results similar to those characteristic of the filament above described. In Fig. 8 the curve 17 is the temperature-resistance percentage curve, before firing, of such a filament having a very thin coating, while curves 18 and 19 show the changes in resistance produced by firing, curve 19 corresponding to a higher temperature of firing than curve 18.

Having thus described my invention and the best manner in which it can be carried out as known to me at the present time, I do not rest my right to a patent on any theory which I have formed of its operation, but will nevertheless now proceed to state what I surmise to be the action occurring.

I am at present of the opinion that certain impurities normally existing in the base filament, probably the potassium, on being driven out by the heat of the electric furnace, unite with the graphite coating or flashing and enable it to soften and sinter together in some combination which is at present unknown to me, perhaps a simple potassium carbon solution, and that this impurity, whatever it may be, is subsequently driven off, leaving the particles of the resulting graphite or carbon associated with each other in a relation different from the relation in which they are associated in all forms of carbon hitherto known to me and probably more analogous to the manner of association of the particles in ordinary metals. Whether this theory be correct or not the invention results in the production, first, of an entirely new form of carbon having valuable uses in the arts and particularly useful in an incandescent lamp filament; and, second, in an incandescent lamp filament of high efficiency and long life. This theory would tend to explain certain of the curves above mentioned, for example curve 7 shows a filament which was fired at 38 amperes before flashing and 38 amperes after flashing; and curve 8 shows a filament which was not fired before flashing but which after flashing was fired at 26 amperes; while curve 10 corresponds to a filament which was fired at 24 amperes prior to flashing and then fired at 38 amperes after flashing. A comparison of these curves would indicate that a high heat in the preliminary firing tended to reduce the drop of resistance which results from the final firing, which would be reasonable on the above assumption since an extremely high temperature at the first firing tends to drive off the impurities which are supposed to play a part in the process carried on during the second or final firing. So also this may help to explain the fact that the filaments which have been fired to a high temperature after flashing but which have not been fired or which have been fired at a relatively low temperature before flashing have a very smooth, black, lustrous coating, while filaments otherwise the same, but given a preliminary high temperature firing before flashing, are not so smooth or lustrous but seem to have a slightly grayish tinge as if the material had not run together as freely. As a confirmation I may mention that I have found that the introduction of certain impurities, as for example salts of potassium or even salts of lead, into the carbon boats in which the filaments are exposed to the action of the electric furnace, has a tendency to cause the coatings of the filaments to have a very smooth, black luster and even to run together or "bead". It is evident that this action, if this theory is correct, cannot take place while the filament is employed in an ordinary incandescent lamp, since it would depend upon the fact that the impurities, potassium or whatever they may be, have, in the furnace, a certain vapor tension or at least remain near the filament, while in a vacuum they would be very much attenuated and driven off. This corresponds to the fact well known in chemistry that the chemical action between two substances in contact depends largely on their respective vapor tensions or concentrations. It is, of course, well known that the filament of an incandescent lamp is not improved, but rather injured, by subjecting it to abnormally high temperatures during operation, as by abnormally increasing the voltage. For example, the test lamps mentioned above are destroyed in a few minutes by the high voltages used in the tests. There is therefore reason to believe that the best results are to be expected when the filaments are massed in bunches and placed in small carbon receptacles as described and exposed to high temperatures at a pressure at least equal to the order of magnitude of atmospheric pressure. I have also found thus far, though this conclusion is not final, that better results are obtained by relying upon the natural impurities such as are found in ordinary commercial pure cotton than by attempting to introduce these impurities artificially.

While I have thus set forth my hypothesis as to the nature of the action occurring when my invention is practiced, it is nevertheless true that others skilled in the art who have followed the progress of the work have advanced the hypothesis that the coating or flashing on an ordinary commercial filament may be a compound substance such for example as a hydrocarbon containing an abnormally low percentage of hydrogen, or, in other words, a very high hydrocarbon, and that the effect of the final firing is to change the nature of this hydrocarbon, producing perhaps a still higher and heretofore unknown hydrocarbon. One, and the only, fact which seems to me to favor this last hypothesis is that hitherto the best filaments made in accordance with my invention have been, broadly speaking, those which have been heated to the highest temperatures in both of the heat treatments and which therefore have been heated to such a high temperature in the preliminary heating or firing that it is not unreasonable to suppose that all of the impurities were eliminated. I am, however, of the opinion that the first firing even at the extreme temperatures mentioned does not entirely eliminate the impurities, and further that it is quite possible that enough potassium vapor remains in the furnace from the first treatment, or in the carbon boats, to produce the results above described. Careful tests made under my direction have not shown the existence of hydrogen in the coating or flashing of filaments to which my invention has been applied.

The discovery hereinbefore referred to, that if the firing before flashing is at a lower temperature than the firing after flashing the filaments become smoother, blacker and more lustrous than if the first firing is at substantially the same temperature as the second, was made subsequent to my invention by one John W. Howell and was utilized by him as a modification of or as an improvement upon my process.

What I claim as new and desire to secure by Letters Patent of the United States, is,—

1. An artificial graphite having a metallic temperature-resistance characteristic.

2. An artificial graphite of specific resistance at 20 degrees C. of less than 0.00016 ohms per cubic centimeter.

3. A carbonaceous substance having a specific resistance, at 20 degrees centigrade, of not over 0.00016 ohms per cubic centimeter.

4. A graphitic substance having a temperature resistance percentage curve running above that of ordinary graphite.

5. A carbonaceous substance characterized by a resistance at atmospheric temperatures below that of other forms of carbon of the same dimensions and having its resistance at about the temperature of incandescence approximating more closely to the resistance of other forms of carbon at about the temperature of incandescence.

6. An artificial graphite of low specific resistance and which has a higher resistance when hot than at atmospheric temperature.

7. A carbonaceous substance having a metallic luster and a low specific resistance, the resistance of which when hot is higher than its resistance at ordinary atmospheric temperatures.

8. A form of graphite which, as compared with other known graphites, reacts more quickly with a mixture of nitric acid and chlorate of potash to form graphitic acid.

9. A filament for an incandescent lamp consisting of a carbon base, and a coating thereon deposited by decomposition of a hydrocarbon, which coating has been altered in character subsequent to its deposition on the base.

10. An incandescent lamp filament coated with carbon, the resistance of which is greater when the filament is hot than when at ordinary atmospheric temperature.

11. A carbonaceous filament, the resistance of which upon increase in temperature in no case falls as low as approximately sixty per cent. of the resistance when cold.

12. A carbonaceous filament, the resistance of which upon increase in temperature may increase greatly above the resistance at ordinary atmospheric temperatures, and in no case falls as low as approximately sixty per cent. of the resistance when cold.

13. A filament of carbonaceous conducting material which, as compared with the filaments of such material heretofore known, is much lower in resistance when cold and, when heated to operating temperature, is comparatively little less in resistance.

14. A carbonaceous filament having its resistance when cold below that of a standard carbon filament of the same dimensions and its resistance when heated to the running temperature considerably nearer to that of an ordinary filament under similar conditions.

15. A carbonaceous filament whose resistance curve from cold to running temperature is more nearly flat than the corresponding curve of a standard carbon filament.

16. A filament containing carbon which is tough, flexible and of low specific resistance at ordinary temperatures and which has a temperature resistance percentage curve running above those of other graphites.

17. A filament containing carbon, the resistance of which, with rising temperature, increases substantially continuously over and above the resistance which it has in the neighborhood of atmospheric temperature.

18. A filament of carbonaceous material the temperature-resistance curve of which with increase of temperature from 20 degrees C. drops in resistance but slightly and then rises above the initial point.

19. A composite filament, the resistance of which, upon increase in temperature, remains above approximately fifty per cent. of the resistance when cold.

20. A composite filament consisting of a base of carbon, and a carbonaceous skin or coating, which skin or coating has a greater resistance when hot than when cool.

21. A composite filament consisting of a base of carbon, and a skin or coating of a form of carbon, which skin or coating has a greater resistance when hot than when cool.

22. A composite carbonaceous filament consisting of a base and a carbonaceous coating thereon, the joint resistance of which is greater when the filament is hot than when at ordinary atmospheric temperature.

23. The method which consists in deriving a carbonaceous product through decomposition of a hydrocarbon, and then heating or firing the product, in a non-oxidizing atmosphere, to a temperature far higher than that necessary to effect such decomposition.

24. The method which consists in depositing a carbonaceous product through decomposition of a hydrocarbon, and then heating or firing the product, in a non-oxidizing atmosphere, to a temperature far higher than that necessary to effect such decomposition and high enough so that the minimum resistances of the product, before and after firing, occurring in a range of rising temperature, as compared with the respective cold resistances, forms a higher percentage in the case of the fired product than in the case of the unfired product.

25. The method which consists in exposing graphitic carbonaceous material such as is deposited from a hydrocarbon to a very high temperature, as herein specified, in an atmosphere containing potassium.

26. The method of improving flashed or treated filaments which consists in heating or firing them, in a non-oxidizing atmosphere, to a temperature very much higher than that employed during flashing and high enough so that the minimum resistances of the fired and unfired filaments respectively, occurring in a range of increasing temperatures, as compared with their respective cold resistances, forms a permanently higher percentage in the case of the fired filament than in the case of the unfired filament.

27. The method which consists in heating a flashed or composite filament to an extremely high temperature in a carbon electric furnace.

28. The method which consists in heating a flashed filament by externally-applied heat to a temperature and for a length of time sufficient to produce as a product a filament, the resistance of which, with increase in temperature, becomes greater than its cold resistance.

29. The method which consists in forming a base filament, depositing thereon a carbonaceous coating, and then heating or firing the filament thus coated to a temperature sufficient to render positive the temperature-resistance co-efficient of the filament.

30. The method which consists in firing a base filament at not less than 2000 degrees centigrade, flashing or treating, and then again firing at a temperature not less than 2000 degrees centigrade.

31. The method which consists in heating an ordinary untreated or unflashed carbon filament to a temperature substantially higher than the carbonizing temperature, then flashing and then firing to a degree and under conditions sufficient to increase greatly the length of life of the filament.

32. The method which consists in heating an ordinary untreated or unflashed carbon filament to a high temperature sufficient to drive out impurities, then flashing the filament, and then firing the flashed filament to a sufficient degree to change permanently the resistance characteristics of the filament.

33. The method which consists in gradually heating up a base filament to a temperature sufficient to drive out impurities, then flashing the filament, and then heating or firing the flashed filament to a degree sufficient to produce permanent changes in its resistance characteristics.

In witness whereof, I have hereunto set my hand this 31st day of January, 1905.

WILLIS R. WHITNEY.

Witnesses:
BENJAMIN B. HULL,
HELEN ORFORD.